(12) United States Patent
Feng et al.

(10) Patent No.: US 7,791,661 B2
(45) Date of Patent: Sep. 7, 2010

(54) CIRCUITS AND METHODS FOR IMAGE SIGNAL SAMPLING

(75) Inventors: Wei Feng, Shenzhen (CN); Wenge Hu, Shenzhen (CN); Jingjun Fu, Shenzhen (CN); Hui Zhao, Shenzhen (CN); Fang Liu, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 445 days.

(21) Appl. No.: 11/952,997

(22) Filed: Dec. 7, 2007

(65) Prior Publication Data
US 2009/0147114 A1 Jun. 11, 2009

(30) Foreign Application Priority Data
Dec. 7, 2007 (CN) .................... 2006 1 0157429 A

(51) Int. Cl.
*H04N 5/335* (2006.01)
*H01L 27/00* (2006.01)
(52) U.S. Cl. ..................................... 348/294; 250/208.1
(58) Field of Classification Search ................. 348/294, 348/216.1, 229.1, 300, 307, 308; 250/208.1
See application file for complete search history.

(56) References Cited
U.S. PATENT DOCUMENTS 7,038,820 B1 * 5/2006 Kindt et al. .................. 358/474
7,352,400 B2 * 4/2008 Sakurai et al. .............. 348/308
7,429,764 B2 * 9/2008 Koizumi et al. ............. 257/292
7,515,183 B2 * 4/2009 Yang et al. .................. 348/241
2007/0229687 A1 * 10/2007 Hiyama et al. .............. 348/294

* cited by examiner

*Primary Examiner*—Lin Ye
*Assistant Examiner*—Trung Diep
(74) *Attorney, Agent, or Firm*—Venture Pacific Law, PC

(57) ABSTRACT

This invention discloses a type of image signal sampling circuits and methods. The circuit includes: a signal acquisition unit, a column read out unit, and a working module control circuit. The control circuit includes: a control unit, a source column switch group, a ground column switch group, and a between-column switch group. Each sampling column circuit is equipped with a source column switch and a ground column switch. The source column switch is connected between the inputs of the signal source and the signal acquisition unit. The ground column switch is connected between the ground and the bottom of the signal acquisition unit. The input of the column read out unit is connected to the input of the signal acquisition unit and the output is used to send out the sampled signal. A between-column switch is installed between the input of a front column signal acquisition unit and the bottom of a back signal acquisition unit. The control unit is used to control the switch in each switch group for connected or disconnected operation according to the sampling working module. Employing this invention can realize gain in the image sensor signal, improvement with circuit structure, achieving minimal chip area, and lowered cost.

20 Claims, 2 Drawing Sheets

CIRCUITS AND METHODS FOR IMAGE SIGNAL SAMPLING

CROSS REFERENCE

This application claims priority from a Chinese patent application entitled "A Type of Image Signal Sampling Circuit and Its Methods" filed on Dec. 7, 2006, having a Chinese Application No. 200610157429.7. This Chinese application is incorporated herein by reference.

FIELD OF TECHNOLOGY

This invention involves sampling circuits for an image sensor, and, in particular, it involves sampling circuits and methods that can increase image signal gain.

BACKGROUND

In the current rapid development of CMOS image sensors, the image signal processing speed seriously hinders the development of high-pixel image sensors. Moreover, the image signal processing speed and the image signal gain also limits each other. In order to increase speed, the gain cannot be too high; but insufficient gain can in turn cause problems in low light image acquisition. Therefore, efforts to increase the gain while not impacting the processing speed has become a focal point in the competition among the design manufacturers of CMOS image sensors.

In the existing technology, the CMOS image sensor generally does not perform processing during image signal sampling operations. Thus the image signal directly samples to the capacitor and then the signal is directly read out. The signal margin only decreases and not increases. In order to solve the image sensor problem in sampling in a low light situation, the image signal sent out from the buffer undergoes a backend process. Thus the sampled signal is magnified; but the technical requirement for this process is much higher. Thus, the existing sampling control circuit structure remains simple and it does not have the ability to increase gain. This results in the output signal to be insufficient in gain, causing the low light effect to be less than ideal.

SUMMARY

This invention solves a technical problem by providing a type of image signal sampling circuits and methods that can increase the image signal gain during the sub-sampling period.

This invention suggests an image signal sampling circuit that includes: a signal acquisition unit and a column read out unit. It also includes a working module control circuit and that control circuit includes: a control unit, a source column switch group, a ground column switch group, and a between-column switch group. Each sampling column circuit is equipped with a source column switch and a ground column switch. The source column switch is connected between the input of the signal source and the input of the signal acquisition unit. The ground switch is connected between the ground and the bottom of the signal acquisition unit. The input of the column read out unit is connected to the input of the signal acquisition unit, and the output is used to send out the sampled signal. A between-column switch is installed between the front column signal acquisition unit input and the bottom of the back column signal acquisition unit. The control unit is used to control the switch in each switch group for disconnect or connect operation according to the sampling working module.

DESCRIPTION OF FIGURES

The foregoing and other objects, aspects and advantages of the invention will be better understood from the following detailed description of the preferred embodiments of this invention when taken in conjunction with the accompanying drawings in which.

DETAILED DESCRIPTIONS OF THE PREFERRED EMBODIMENTS

Figure 1:
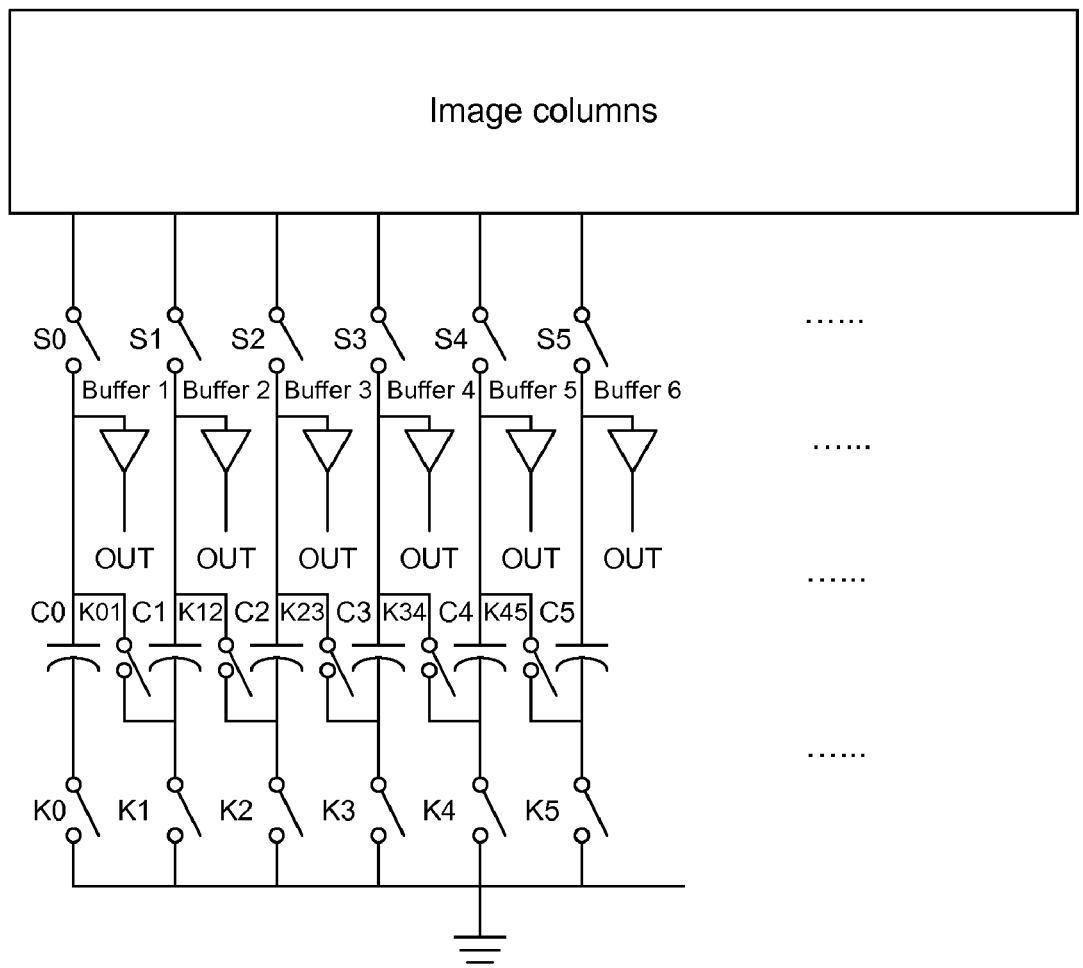
FIG. 1 is a 1/X sub-sampling circuit schematics of this invention.

This invention solves a technical problem by suggesting a type of image signal sampling circuits and methods that can increase the image signal gain during the sub-sampling period.

This invention suggests an image signal sampling circuit that includes: a signal acquisition unit and a column read out unit. It also includes a working module control circuit and that control circuit includes: a control unit, a source column switch group, a ground column switch group, and a between-column switch group. Each sampling column circuit is equipped with a source column switch and a ground column switch. The source column switch is connected between the input of the signal source and the input of the signal acquisition unit. The ground switch is connected between the ground and the bottom of the signal acquisition unit. The input of the column read out unit is connected to the input of the signal acquisition unit, and the output is used to send out the sampled signal. A between-column switch is installed between the front column signal acquisition unit input and the bottom of the back column signal acquisition unit. The control unit is used to control the switch in each switch group for disconnect or connect operation according to the sampling working module.

Preferably, the signal acquisition unit includes several sampling capacitors. Each sampling column circuit is equipped with a sampling capacitor that is used to sample the pixels of that sampling column.

Preferably, the column read out unit includes several buffers. Each sampling column circuit is equipped with a buffer that is used to cache and read out the sampled signal of that sampling column.

Preferably, the source column switch group, the ground column switch group and the between-column switch group use MOS switches.

The image signal sampling methods provided by this invention include the following conditions:

1) Normal working mode: During sampling, the control unit controls each switch in the source column switch group and the ground column switch group to be in the connected state; the switches in the between-column switch group to be in the disconnected state; after sampling, read from the read out unit of each sampling column the sampling signal.

2) In 1/X sub-sampling mode, X is an integer greater than 1: during sampling, the control unit controls each switch in the source column switch group and the ground column switch group to be in the closed state and each switch in the between-column switch group to be in the disconnected state. After the sampling is complete, it controls the column switches between the N×X−1 column sampling column circuit and N×X column sampling column circuit to be in the disconnected state and each of the remaining switches in the column switch group to be in the connected state. The source column switch of the (N−1)×X column sampling column circuit is in the disconnected state; the ground switch is in the closed state; the source column switch and the ground column switch of the each remaining column are in the disconnected state. N is 1, 2, 3, . . . ; from the column read out unit of each N×X−1 column sampling column circuit, it reads out the sampled signal of the 1/X sub-sampling.

Preferably, the column read out unit includes several buffers. Each sampling column circuit is equipped with a buffer that is used to cache and read out the sampled signal of that sampling column.

Preferably, the source column switch group, the ground column switch group and column switch group use MOS switches.

Preferably, the 1/X sub-sampling mode is ½ sub-sampling mode.

The technical effects of using the technical proposal of this invention are:

1) Through the working module control circuit, the sampling circuits and methods of this invention can have flexible control and operation of the sampling circuit under the normal mode or the 1/X sub-sampling mode to complete several different sampling methods.

2) In the 1/X sub-sampling mode of this invention, through changing the connections of the control circuit, the image signal acquisition unit can be connected in series resulting in the sampled signal to increase by X times of its original sampled signal. Thus, it solves the image sensor technical problems for low light image acquisition.

3) The control circuit of this invention accomplishes the increase in image sensor signal gain through controlling each switch components. It also further improves the circuit structure and thus it helps save cost by requiring minimal increase in chip area in order to attain this capability.

The following figures and implementations provide further detail explanation of this invention.

Per 1/X sub-sampling circuit shown in FIG. 1, the control unit (not shown in figure) controls three switch groups: the source column switch group, the ground column switch group, and the between-column switch group allowing the circuit to operate under normal working mode and sampling working mode. In the figure, S0, S1, S2, . . . are the source column switches; K0, K1, K2, . . . are the ground column switches; K01, K12, K23, K34, K45, . . . are the between-column switches. Each sampling column circuit is equipped with a source switch and a ground switch and each adjacent sampling column is equipped with a between-column switch. The switch and control unit compose the working mode control circuit of this invention. The signal acquisition unit is composed by capacitor C0, C1, C2 . . . . The column read out unit is composed by buffer 1, buffer 2, . . . . Each sampling column circuit is equipped with a capacitor and a buffer.

The pixel column outputs the column direction image signal, through the source column switches S0, S1, S2, . . . , it passes on the column direction image signal to the buffers and capacitors C0, C1, C2, . . . . The buffers output is the column read out signal; the capacitors C0, C1, C2, . . . are used to sample the image signal; the C0, C1, C2, C3, . . . control whether the grounds are connected through the ground switches K0, K1, K2, K3 . . . . The between-column switches K01, K12, K23, . . . each is connected between the adjacent column forward sampling capacitor upper terminal and the adjacent column back sampling capacitor lower terminal.

Under the normal working mode, the control circuit connectivity is as follows: the source column switches S0, S1, S2, . . . , the ground switches K0, K1, K2, . . . are closed and the between-column switches K01, K23, K34, K45, . . . are disconnected. The first column pixels sample through the sampling capacitor C0, the second column pixels sample through the sampling capacitor C1, . . . the sampling capacitor C0 voltage is U0 where the sampling capacitor electric charge volume is $Q0=C0U0$; the sampling capacitance C1 voltage is U1 where $Q1=C1U1$, . . . . The signal is read out through the buffers after sampling.

Figure 2:
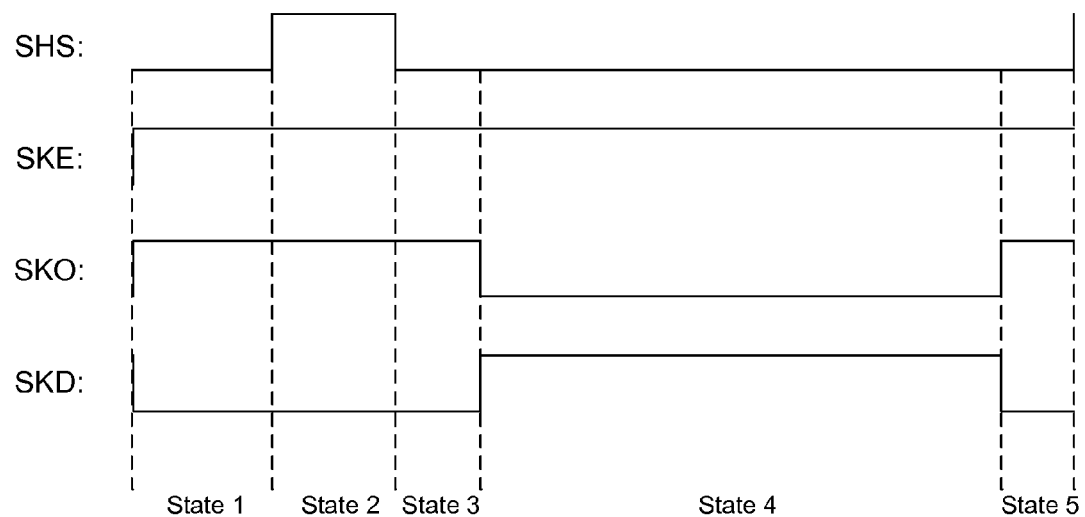
FIG. 2 is a timing control diagram of the preferred implementation of the ½ sub-sampling switch group of this invention.

For the embodiment of the control unit, the typical realization method is through the output of high/low electric levels to control the switching of the column switch group. Per FIG. 2, it shows a timing control diagram of the control unit during the ½ sub-sampling.

SHS is the overall timing signal that controls switches S0, S1, S2, . . . . The switches are closed while this signal is at the high level.

SKE is the overall timing signal that controls the even column to ground switches K0, K2, K4, . . . . The switches are closed when the signal is at the high level and it maintains at the high level during the ½ sub-sampling.

SKO is the overall timing signal that controls the odd column to ground switches K1, K3, K5, . . . . The switches are closed when this signal is at the high level.

SKD is the overall timing signal that controls the column switches K01, K23, K45, . . . . The switches are closed when this signal is at the high level.

Under the ½ sub-sampling mode, the control circuit connectivity is as follows: the control signal SHS controls the source column switches S0, S1, S2, . . . to be closed for sampling. The control signals SKE and SKO control the ground column switches K0, K1, K2, . . . to be closed. The control signal SKD controls the between-column switches K0, K23, K45, . . . to be disconnected. The capacitors C0, C1, C2, . . . first conduct sampling and the sampling capacitor C0 upper terminal voltage is U0. The between-column switches K12, K34, . . . continue to be at the disconnected state.

After sampling is complete the control signal SHS controls the source column switches S0, S1, S2, . . . to be disconnected. The control signal SKO controls the ground column switches K1, K3, K5 . . . to be disconnected. The control signal SKE controls the ground column switches K0, K2, K4, . . . to maintain at closed. The between-column switches K12, K34, . . . to maintain at the disconnected state. The control signal SKD controls the column switches K01, K23, K45, . . . to be closed. As a result the sampling capacitor C1 upper terminal voltage becomes U0+U1, that is 2U1 (the group columns are neighbors and the sampled voltages on the two sampling capacitors are considered to be equal.), and $Q1=2C1U1$. Therefore, during ½ sub-sampling, the image signal doubles the original. The signal is read out through the buffers after sampling is complete. Each switch in the source column switch group, the ground column switch group, and between-column switch group uses MOS switches.

For the 1/X sub-sampling mode (1/X is the sub-sampling quantity where X is an integer greater than 1), the on-off of its column switch is somewhat different after the sampling is complete. The purpose of the between-column switches is to accumulate several sampling signal voltages to X multiple times of the sampling capacitor voltage, resulting in the sampled image signal is increased to X times of its original. No further implementation will be used to provide explanation here.

Furthermore, for the ½ sub-sampling mode, since the circuit between-column switches in FIG. 1 K12, K34, . . . continue to maintain at the disconnected state, the above switches can be eliminated under a fixed sub-sampling mode. For the 1/X sampling, the between-column switches between the N×X−1 column sampling column circuit and N×X column sampling column circuit can be eliminated, where N is 1, 2, 3, . . . (N is the group number during 1/X sampling).

While the present invention has been described with reference to certain preferred embodiments, it is to be understood that the present invention is not limited to such specific embodiments. Rather, it is the inventor's contention that the invention be understood and construed in its broadest meaning as reflected by the following claims. Thus, these claims are to be understood as incorporating not only the preferred embodiments described herein but also all those other and further alterations and modifications as would be apparent to those of ordinary skilled in the art.

We claim:

1. An image signal sampling circuit for generating sampled signals from an image sensor, wherein said image sensor providing image signal source, comprising:
    two or more sampling column circuits connecting to said image sensor, wherein each sampling column circuit having
        a source column switch having a first end connecting to an output of said image sensor, and a second end connecting to a column read out unit and a first end of a capacitor,
        said column read out unit having a second end for outputting a sampled signal,
        said capacitor having a second end connecting to a first end of a ground column switch,
        said ground column switch having a second end connected to ground, and
        a between-column switch having a first end connected to the second end of the source column switch and a second end connected to a second end of a capacitor of a second sampling column circuit; and
    a control unit for controlling the source column switches, the ground column switches, and the between-column switches.

2. The circuit of claim 1, wherein the capacitor is used to sample one or more pixels in that sampling column of the image sensor.

3. The circuit of claim 1 wherein the column read out unit includes one or more buffers that is used to cache and read out the sampled signal of that sampling column circuit.

4. The circuit of claim 1 wherein the source column switch group, the ground column switch group and the between-column switch group use MOS switches.

5. The circuit of claim 1 wherein said circuit operating in a normal working mode, wherein during sampling, the control unit controls the switches in the source column switch group and the ground column switch group to be in the connected state, the between-column switch group in the disconnected state; wherein after sampling, reading from the read out unit of each sampling column circuit the sampled signal.

6. The circuit of claim 1 wherein said circuit operating in an 1/X sub-sampling mode, wherein 1/X is the sub-sampling quantity and X is an integer greater than 1; wherein during sampling, the control unit controls the switches in the source column switch group and the ground column switch group to be in the connected state and the switches in the between-column switch group to be in the disconnected state; wherein after sampling is complete, the control circuit controls the column switches between the N×X−1 column sampling column circuit and the N×X column sampling column circuit to be in the disconnected state and the other switches in the between-column switch group to be in the connected state, the source column switches of the (N−1)×X column sampling column circuit to be in the disconnected state, the ground switch to be in the connected state, and the source column switch and the ground column switch of each remaining column are in the disconnected state, where N is 1, 2, 3, . . . , and N is 1/X sampling group number during sampling; wherein from the column read out unit of each N×X−1 column sampling column circuit, the sampled signal of the 1/X sub-sampling is read out.

7. The circuit of claim 6 wherein the 1/X sub-sampling mode is a ½ sub-sampling mode.

8. The circuit of claim 1 wherein said circuit operating in an 1/X sub-sampling mode, wherein 1/X is the sub-sampling quantity and X is an integer greater than 1; wherein during sampling, the control unit controls the switches in the source column switch group and the ground column switch group to be in the connected state and the switches in the between-column switch group to be in the disconnected state; wherein after sampling is complete, the control circuit controls the column switches between the N×X−1 column sampling column circuit and the N×X column sampling column circuit to be in the disconnected state and the other switches in the between-column switch group to be in the connected state, the source column switches of the (N−1)×X column sampling column circuit to be in the disconnected state, the ground switch to be in the connected state, and the source column switch and the ground column switch of each remaining column are in the disconnected state, where N is 1, 2, 3, . . . , and N is 1/X sampling group number during sampling; wherein from the column read out unit of each N×X−1 column sampling column circuit, the sampled signal of the 1/X sub-sampling is read out.

9. The circuit of claim 8 wherein the 1/X sub-sampling mode is a ½ sub-sampling mode.

10. An image signal sampling circuit for generating sampled signals from an image sensor, wherein said image sensor providing image signal source, comprising:
    two or more sampling column circuits connecting to said image sensor, wherein each sampling column circuit having
        a source column switch having a first end connecting to an output of said image sensor, and a second end connecting to a column read out unit and a first end of a capacitor,
        said column read out unit, having one or more buffers for caching and reading out the sampled signal of that sampling column circuit and having a second end for outputting a sampled signal,
        said capacitor, for sampling one or more pixels in that sampling column of the image sensor, having a second end connecting to a first end of a ground column switch,
        said ground column switch having a second end connected to ground, and
        a between-column switch having a first end connected to the second end of the source column switch and a second end connected to a second end of a capacitor of a second sampling column circuit; and
    a control unit for controlling the source column switches, the ground column switches, and the between-column switches.

11. The circuit of claim 10 wherein said circuit operating in a normal working mode, wherein during sampling, the control unit controls the switches in the source column switch group and the ground column switch group to be in the connected state, the between-column switch group in the disconnected state; wherein after sampling, reading from the read out unit of each sampling column circuit the sampled signal.

12. The circuit of claim 10 wherein said circuit operating in an 1/X sub-sampling mode, wherein 1/X is the sub-sampling quantity and X is an integer greater than 1; wherein during sampling, the control unit controls the switches in the source column switch group and the ground column switch group to be in the connected state and the switches in the between-column switch group to be in the disconnected state; wherein after sampling is complete, the control circuit controls the column switches between the N×X−1 column sampling column circuit and the N×X column sampling column circuit to be in the disconnected state and the other switches in the between-column switch group to be in the connected state, the source column switches of the (N−1)×X column sampling column circuit to be in the disconnected state, the ground switch to be in the connected state, and the source column switch and the ground column switch of each remaining column are in the disconnected state, where N is 1, 2, 3, . . . , and N is 1/X sampling group number during sampling; wherein from the column read out unit of each N×X−1 column sampling column circuit, the sampled signal of the 1/X sub-sampling is read out.

13. The circuit of claim 12 wherein the 1/X sub-sampling mode is a ½ sub-sampling mode.

14. An image signal sampling circuit for generating sampled signals from an image sensor, wherein said image sensor providing image signal source, comprising:
   a signal acquisition unit having one or more inputs and outputs;
   a column read out unit having one or more inputs and outputs;
   a control circuit having a control unit and operating a source column switch group, a ground column switch group and a between-column switch group; and
   one or more sampling column circuits connecting to said image sensor, wherein each sampling column circuit having a source column switch and a ground column switch;
   wherein the source column switch is connected between the input of the image signal source and the input of the signal acquisition unit;
   wherein the ground switch is connected between the ground and the bottom of the signal acquisition unit;
   wherein the input of the column read out unit is connected to the input of the signal acquisition unit and the output of the column read out unit outputs the sampled signal;
   wherein a between-column switch is installed between the input of a front column signal acquisition unit and the bottom of a back column signal acquisition unit; and
   wherein the control unit is used to control the source column switch group, the ground column switch group and the between-column switch group.

15. The circuit of claim 14, wherein the signal acquisition unit includes several sampling capacitors and wherein each sampling column circuit is equipped with a sampling capacitor that is used to sample one or more pixels in that sampling column of the image sensor.

16. The circuit of claim 14 wherein the column read out unit includes one or more buffers and wherein each sampling column circuit is equipped with a buffer that is used to cache and read out the sampled signal of that sampling column circuit.

17. The circuit of claim 14 wherein the source column switch group, the ground column switch group and the between-column switch group use MOS switches.

18. The circuit of claim 14 wherein said circuit operating in a normal working mode, wherein during sampling, the control unit controls the switches in the source column switch group and the ground column switch group to be in the connected state, the between-column switch group in the disconnected state; wherein after sampling, reading from the read out unit of each sampling column circuit the sampled signal.

19. The circuit of claim 14 wherein said circuit operating in an 1/X sub-sampling mode, wherein 1/X is the sub-sampling quantity and X is an integer greater than 1; wherein during sampling, the control unit controls the switches in the source column switch group and the ground column switch group to be in the connected state and the switches in the between-column switch group to be in the disconnected state; wherein after sampling is complete, the control circuit controls the column switches between the N×X−1 column sampling column circuit and the N×X column sampling column circuit to be in the disconnected state and the other switches in the between-column switch group to be in the connected state, the source column switches of the (N−1)×X column sampling column circuit to be in the disconnected state, the ground switch to be in the connected state, and the source column switch and the ground column switch of each remaining column are in the disconnected state, where N is 1, 2, 3, . . . , and N is 1/X sampling group number during sampling; wherein from the column read out unit of each N×X−1 column sampling column circuit, the sampled signal of the 1/X sub-sampling is read out.

20. The circuit of claim 19 wherein the 1/X sub-sampling mode is a ½ sub-sampling mode.

* * * * *